US011310727B2

(12) United States Patent
Su (10) Patent No.: US 11,310,727 B2
(45) Date of Patent: Apr. 19, 2022

(54) METHODS, DEVICES AND MEDIA FOR OBTAINING AND FOR PROVIDING ACCESS INFORMATION OF WIRELESS ACCESS POINTS

(71) Applicant: SHANGHAI LIANSHANG NETWORK TECHNOLOGY CO., LTD., Shanghai (CN)

(72) Inventor: Yong Su, Shanghai (CN)

(73) Assignee: SHANGHAI LIANSHANG NETWORK TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/942,783

(22) Filed: Jul. 30, 2020

(65) Prior Publication Data

US 2020/0359308 A1 Nov. 12, 2020

Related U.S. Application Data

(63) Continuation of application No. PCT/CN2018/124521, filed on Dec. 27, 2018.

(30) Foreign Application Priority Data

Jan. 30, 2018 (CN) .......................... 201810089014.3

(51) Int. Cl.
*H04W 48/16* (2009.01)
*H04W 4/14* (2009.01)
(Continued)

(52) U.S. Cl.
CPC ............. *H04W 48/16* (2013.01); *H04W 4/14* (2013.01); *H04W 12/06* (2013.01); *H04W 48/14* (2013.01); *H04W 84/12* (2013.01)

(58) Field of Classification Search
CPC ................................................... G06Q 30/0261
(Continued)

(56) References Cited

U.S. PATENT DOCUMENTS 9,426,744 B2 8/2016 Yeo
2005/0130627 A1* 6/2005 Calmels ................ H04W 12/50
455/411

(Continued)

FOREIGN PATENT DOCUMENTS

CN 101193024 A 6/2008
CN 102572736 A 7/2012
(Continued)

*Primary Examiner* — Kiet M Doan
(74) *Attorney, Agent, or Firm* — Kilpatrick Townsend & Stockton, LLP (57) ABSTRACT

Disclosed are methods, devices and media for obtaining and for providing access information of wireless access points. The method comprises: searching for wireless access points to obtain identification information of one or more wireless access points; encoding the identification information of the one or more wireless access points according to a preset data short message encoding format to generate a query request data short message; sending the query request data short message to a designated network device; and receiving an access information data short message which is returned by the designated network device in response to the query request data short message and is encoded and generated according to the preset data short message encoding format. Thus, the terminal device is able to access the wireless access point when mobile data is unavailable, and security of information during transmission can also be guaranteed.

19 Claims, 4 Drawing Sheets

(51) Int. Cl.
 *H04W 12/06* (2021.01)
 *H04W 48/14* (2009.01)
 *H04W 84/12* (2009.01)

(58) Field of Classification Search
 USPC .............................................. 455/41.2, 426.1
 See application file for complete search history.

(56) References Cited

U.S. PATENT DOCUMENTS

2006/0143244 A1* 6/2006 Chia ................. H01L 21/67276
2017/0094515 A1* 3/2017 Salo ....................... H04W 12/06
2017/0359319 A1* 12/2017 Kelsey ................. H04W 12/03

FOREIGN PATENT DOCUMENTS

| | | |
|---|---|---|
| CN | 102638797 A | 8/2012 |
| CN | 103458408 A | 12/2013 |
| CN | 103458409 A | 12/2013 |
| CN | 103476092 A | 12/2013 |
| CN | 104427589 A | 3/2015 |
| CN | 105873237 A | 8/2016 |
| CN | 107534859 A | 1/2018 |
| WO | 0115462 A1 | 3/2001 |

\* cited by examiner

| 01 | 0D | 7A | 65 | 6E | 6D | 65 | 6E | 06 | 31 | 32 | 33 | 34 | 35 | 36 |
|----|----|----|----|----|----|----|----|----|----|----|----|----|----|----|
| type | length | z | e | n | m | e | n | length | | | password123456 | | | |

FIG. 5a

| 11 | 08 | 00 | 69 | 4E | 66 | 99 | 99 | 56 | ED | 08 | 31 | 32 | 33 | 34 | 35 | 36 | 37 | 38 |
|----|----|----|----|----|----|----|----|----|----|----|----|----|----|----|----|----|----|----|
| type | length | | i | 书 | | 香 | | 园 | | length | | | | password12345678 | | | | |

METHODS, DEVICES AND MEDIA FOR OBTAINING AND FOR PROVIDING ACCESS INFORMATION OF WIRELESS ACCESS POINTS

CROSS REFERENCE TO THE RELATED APPLICATION

This application is the continuation application of International Application No. PCT/CN2018/124521, filed on Dec. 27, 2018, which is based upon and claims priority to Chinese Patent Application No. 201810089014.3, filed on Jan. 30, 2018, the entire contents of which are incorporated herein by reference.

FIELD

The specification relates to computer technologies, and particularly relates to methods, devices and media for obtaining and for providing access information of wireless access points.

BACKGROUND

With the development and popularity of the mobile communication technology, more and more terminal devices (for example, mobile phones) may achieve network connection via a wireless access point. For example, a mobile phone used by a user may connect to a wireless access point such as a WiFi (Wireless-Fidelity) hotpot or a mobile hotpot to achieve network connection. However, in general, a login password is often required to connect to the above wireless access point, which means the user's network access requirements cannot be satisfied.

In the prior art, in order to facilitate access to a wireless access point for a terminal device such as a mobile phone, it is possible to log in to the network after obtaining a login password for a shared wireless access point via a corresponding application. In the process of obtaining a login password, the above application may establish a connection with an access point information storage server with mobile data of the mobile phone, and request the login password for the wireless access point from the access point information storage server.

However, in practical applications, there might be a situation where mobile data is exhausted or a switch of data network (a cellular network) is not turned on. In this situation, the mobile phone cannot establish the connection with the access point information storage server, and thus cannot obtain a login password for the shared wireless access point, which will eventually lead to the mobile phone's inability to connect to the wireless access point.

Based on the prior art, a solution for accessing a wireless access point without using mobile data is needed.

SUMMARY

The methods, devices and media for obtaining and for providing access information of wireless access points provided in the embodiments of the specification are used to solve the following problems: a solution for networking with the wireless access point when mobile data is unavailable.

A method for obtaining access information of wireless access points is provided by an embodiment of the specification. The method comprises:

searching for wireless access points to obtain identification information of one or more wireless access points;

encoding the identification information of the one or more wireless access points according to a preset data short message encoding format to generate an encrypted query request data short message;

sending the query request data short message to a designated network device; and receiving an access information data short message which is returned by the designated network device in response to the query request data short message and is encoded and generated according to the preset data short message encoding format.

In one embodiment, the identification information comprises: names and/or MAC addresses of the wireless access points.

Encoding the identification information of the one or more wireless access points according to the preset data short message encoding format comprises:

for identification information of any of the wireless access points, determining name and/or MAC address of the wireless access point carried therein; and encoding the name and/or the MAC address of the wireless access point to obtain an encoded character string in form of a data short message.

In one embodiment, the identification information further comprises byte length of the name of the wireless access point and/or type information of the wireless access point.

Encoding the identification information of the one or more wireless access points according to the preset data short message encoding format comprises:

for any of multiple pieces of identification information, determining the names and/or the MAC addresses, the byte lengths of the names and/or the type information of the wireless access points carried therein; and encoding the names and/or the MAC addresses, the byte lengths of the names and/or the type information of the wireless access points to obtain an encoded character string in form of a data short message.

In one embodiment, encoding the identification information of the one or more wireless access points according to the preset data short message encoding format comprises:

encoding the identification information of the one or more wireless access points with a preset 8-bit encoding format to obtain an encoded character string in form of a data short message.

In one embodiment, before generating the query request data short message, the method further comprises:

encrypting an encoding result.

In one embodiment, encrypting the encoding result comprises:

encrypting the encoding result with an equal-byte encryption algorithm;

and byte length of the encoding result after encryption is the same as byte length of that before encryption.

In one embodiment, the method further comprises:

compressing byte length of the encrypting result with a compression algorithm.

In one embodiment, sending the query request data short message to the designated network device comprises:

sending the query request data short message to a preset communication port of a designated short message gateway.

In one embodiment, the method further comprises:

extracting the identification information and access information of the one or more wireless access points from the received access information data short message; and connecting to one of the one or more wireless access points with the identification information and the access information.

A device for obtaining access information of wireless access points is provided by an embodiment of the specification. The device includes a memory for storing computer program instructions and a processor for executing program instructions, and the computer program instructions, when executed by the processor, trigger the device to perform the above methods.

A method for providing access information of wireless access points is provided by an embodiment of the specification. The method comprises:

receiving, by a network device, a query request data short message sent by a terminal device, and the query request data short message is generated by encoding identification information of one or more wireless access points according to a preset data short message encoding format; and in response to the query request data short message, encoding the access information of the one or more wireless access points according to the preset data short message encoding format to generate an access information data short message and returning it to the terminal device.

In one embodiment, the network device comprises: a short message gateway and an access information storage server.

In one embodiment, receiving, by the network device, the query request data short message sent by the terminal device comprises:

receiving, by the short message gateway, the query request data short message sent by the terminal device; and extracting the identification information of the one or more wireless access points from the query request data short message, and sending it to the access information storage server;

and the identification information comprises: at least one type of names and MAC addresses of the wireless access points.

In one embodiment, in response to the query request data short message, encoding the access information of the one or more wireless access points according to the preset data short message encoding format to generate the access information data short message and returning it to the terminal device comprises:

performing a query, by the access information storage server, according to the identification information of the one or more wireless access points;

sending, to the short message gateway, the retrieved identification information and access information of the one or more wireless access points;

encoding, by the short message gateway, the identification information and the access information of the one or more wireless access points according to the preset data short message encoding format to generate the access information data short message; and sending the access information data short message to the terminal device.

In one embodiment, encoding, by the short message gateway, the identification information and the access information of the one or more wireless access points according to the preset data short message encoding format comprises:

for the identification information and the access information of any of the wireless access points, encoding, by the short message gateway, name and access information of the wireless access point with the preset data short message encoding format.

In one embodiment, encoding, by the short message gateway, the identification information and the access information of the one or more wireless access points according to the preset data short message encoding format when the short message gateway receives identification information and access information of multiple wireless access points, comprises:

for any of multiple wireless access points, encoding, by the short message gateway, name, access information length and access information of the wireless access point with the preset data short message encoding format.

In one embodiment, encoding, by the short message gateway, the identification information and the access information of the one or more wireless access points according to the preset data short message encoding format comprises:

encoding, by the short message gateway, the identification information and the access information of the one or more wireless access points with a preset 8-bit encoding format.

In one embodiment, before generating the access information data short message, the method further comprises:

encrypting the encoding result with an equal-byte encryption algorithm;

and byte length of the encoding result after encryption is the same as byte length of that before encryption.

In one embodiment, generating the access information data short message comprises:

performing byte compression on an encoding and encrypting result with a compression algorithm to generate the access information data short message.

A device for obtaining access information of wireless access points is provided by an embodiment of the specification. The device includes a memory for storing computer program instructions and a processor for executing program instructions, and the computer program instructions, when executed by the processor, trigger the device to perform the above-mentioned methods.

A computer readable medium storing computer readable instructions is provided by an embodiment of the specification, and the computer readable instructions executable by a processor to implement the above-mentioned methods.

When mobile data of a terminal device is unavailable, the terminal device may encode the obtained identification information of the wireless access points to generate a query request data short message, and send it to a corresponding network device in the form of a short message. Thus, the network device may extract the identification information of the wireless access points from the query request data short message, and retrieve matching access information (e.g., login passwords) from pre-stored information of wireless access points, to feed it back to the terminal device. In this way, the terminal device can obtain access information of wireless access points when mobile data is unavailable, which can meet the needs of the user to connect to a wireless access point, effectively improving the user's networking experience effect. In addition, in the entire process, an application (or a data short message service) which has functions of sending and receiving a data short message and is running on the terminal device can self-designate a communication port for sending or receiving a data short message. However, other application or service running on the terminal device usually does not monitor this self-designated port, and thus is unable to obtain the data short message. Also, it is more appropriate to encrypt a data short message, information transmitted between the terminal device and the network device is encrypted, and thus security of information during transmission is guaranteed.

DESCRIPTIONS OF THE DRAWINGS

Embodiments of the specification are explained in the drawings below.

DETAILED EMBODIMENTS

Embodiments of the specification, will be described below clearly and completely in conjunction with the drawings in the embodiments of the specification. The described embodiments are merely a part of the embodiments of the present application, not all the embodiments.

In one or more embodiments of the specification, the wireless access points may comprise wireless-type access points which can be used for networking, such as WiFi hotspots, mobile hotspots, etc.

Figure 1:
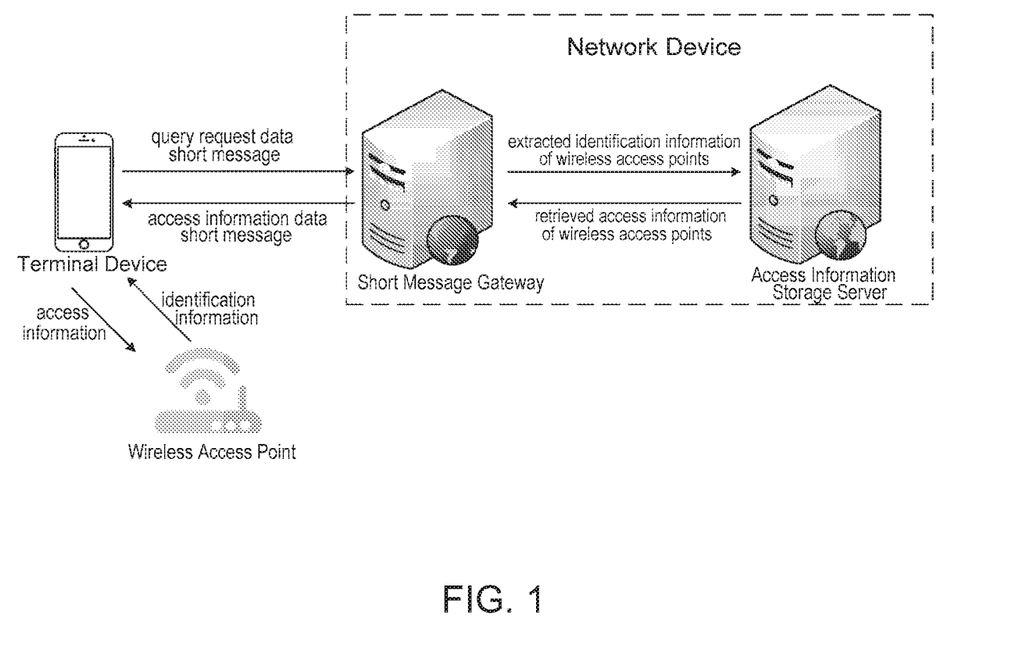
FIG. 1 is a schematic diagram of an architecture on which a solution of the specification is based.

FIG. 1 is a schematic diagram of an architecture on which a solution of the specification is based. As can be seen from FIG. 1, the architecture may comprise at least a terminal device and a network device of a service provider, which further comprises a short message gateway and an access information storage server of the service provider.

The terminal device may be a device for networking with a telecom operator, such as a mobile phone, a smart watch, a tablet, etc. In general, in order to achieve network connection between the terminal device and the telecom operator, a Subscriber Identity Module (SIM) card may be installed on the terminal device. Based on the SIM card, the terminal device may send a short message to the short message gateway of the service provider. In one or more embodiments of the specification, an application provided by the service provider (referred to as an app in the description below) is installed and runs on the terminal device. Through the app, information of one or more wireless access points obtained by the terminal device is encoded and encrypted, and is sent to the short message gateway in the form of a short message. However, in other embodiments of the specification, there is no need to install and launch the above app additionally. The above functions that can be implemented by the app may be integrated and set directly in an operating system of the terminal device. Of course, both of the above two kinds of embodiments can achieve the purpose of the present application. Which of the above methods is adopted will be determined according to the needs of practical applications, and should not be interpreted as limitations on the present application here.

The short message gateway of the service provider is usually assigned by the telecom operator. On such basis, the service provider may send short messages containing service content to different users as well as receive short messages sent by different users via the assigned short message gateway. In the scenario of the specification, both a query request data short message sent by the terminal device and access information fed back by the access information storage server may be transmitted via the short message gateway. It should be noted that the short message gateway has functions of decryption and encryption, which are used to decrypt encrypted short message content from the terminal device and are used to encrypt the access information provided by the access information storage server.

The access information storage server of the service provider is used to store information of wireless access points, such as names, physical addresses, and login passwords of the wireless access points, etc. In practical applications, the access information storage server may be implemented in such an architecture as a single server, a cluster of servers, and/or distributed servers, etc. No specific limitation is made here.

For ease of understanding, the following embodiments will be described in a scenario where a mobile phone is connected to a WiFi hotspot as an example.

Based on the above-mentioned architecture as shown in FIG. 1, the solution of the specification will be described in detail below.

Figure 2:
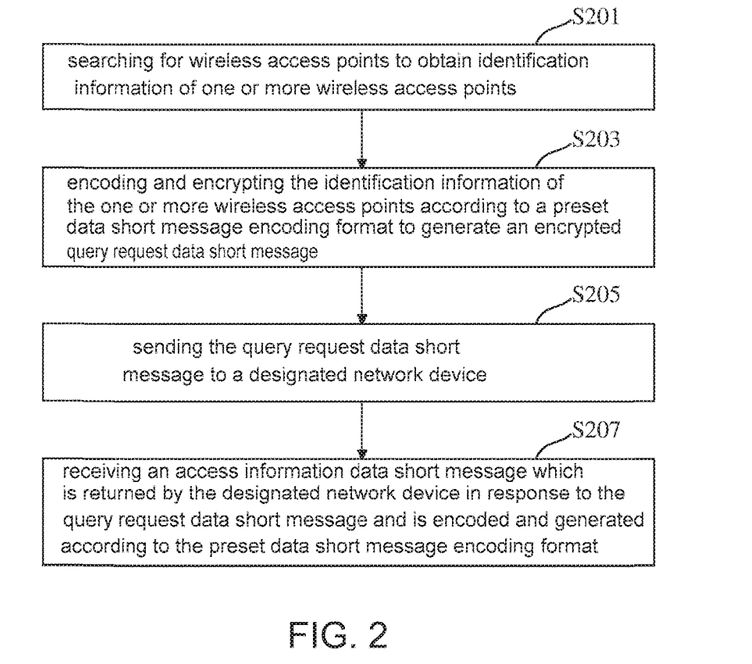
FIG. 2 is a schematic flowchart of a method for obtaining access information of wireless access points provided by an embodiment of the specification.

At a terminal device, a method for obtaining access information of wireless access points is provided by an embodiment of the specification. A schematic flowchart of the method is illustrated in FIG. 2, and the method may comprise the following steps.

Step S201, wireless access points are searched to obtain identification information of one or more wireless access points.

In a scenario where the terminal device is a mobile phone, when a user turns on a wireless network switch of the mobile phone, signals of one or more wireless access points in the vicinity can be searched. In other words, the mobile phone used by the user may obtain identification information of these wireless access points which may comprise information such as names, MAC addresses, and/or Service Set Identifiers (SSIDs) of the wireless access points, etc.

Step S203, the identification information of the one or more wireless access points is encoded according to a preset data short message encoding format to generate a query request data short message.

It should be noted that short messages may be divided into data short messages (encoded in 8-bit encoding format) and text short messages (encoded in 7-bit encoding format or encoded in UCS2 encoding format) according to encoding formats, and the data short messages are more suitable for transmitting data messages and are more suitable for encryption/decryption, while the text short messages are more suitable for transmitting text messages containing ASCII characters or UCS2 characters.

Here, given that in practical application scenarios, the form for presenting message content of a text short message is more intuitive (the message content of the text short message is usually encoded into Chinese characters, English letters, etc.), there is a degree of risk during transmission. Therefore, in the embodiments of the specification, data short messages are selected for information transmission.

Further, the identification information of the one or more wireless access points is thus encoded according to a preset data short message encoding format to generate a data short message. The message content of the generated data short message is usually encoded content with no obvious meaning, such as a character string composed of a series of hexadecimal digits.

It should be noted that according to a short message standard, a data short message may contain 140 bytes. Therefore, if the terminal device obtains identification information of multiple wireless access points, in order to send as much Information as possible in a limited number of bytes, a compression algorithm may be adopted additionally to compress information in the data short message.

Step S205, the query request data short message is sent to a designated network device.

Given that in practical applications, a data short message may be sent via the GSM (Global System for Mobile Communication) system. If mobile data of a mobile phone is unavailable, data transmission may be carried out in the form of a short message. That is, in the embodiments of the specification, the query request is sent to the designated network device in form of an encrypted short message.

The designated network device mentioned herein may be referred as the network device shown in FIG. 1, i.e., the short message gateway and the access information storage server of the service provider.

It should be noted that in the process of sending a data short message, a corresponding app (or data short message service) running on the terminal device may self-designate a port for sending a data short message. Similarly, this is also applicable to the process of receiving a data short message. In this situation, other application or service that is not monitoring the port is unable to receive the data short message. Thus, security of information transmission is further increased.

Step S207, an access information data short message which is returned by the designated network device in response to the query request data short message and is encoded and generated according to the preset data short message encoding format is received.

In general, a method for responding to, by the network device, the query request is as follows. After receiving a query request data short message, the short message gateway may extract identification information of wireless access points from the data short message and send it to a storage server. Further, the storage server feeds access information, such as a login password of an access point, from its pre-stored access information back to the short message gateway, and then feeds it back to the terminal device via the short message gateway (this process will be described in detail in the following embodiments).

Further, after obtaining access information (e.g., a login password), the terminal device may establish a connection with a wireless access point with the access information.

It can be known from the above method, when mobile data of the terminal device is unavailable, the terminal device may also encode the obtained identification information of the wireless access point to generate a query request data short message, and send it to the corresponding network device. Thus, the network device may extract the identification information of the wireless access points from the query request data short message, and retrieve matching access information (e.g., login passwords) from the pre-stored information of wireless access points, to feed it back to the terminal device. In this way, the terminal device can obtain access information of wireless access points when mobile data is unavailable, which can meet the needs of the user to connect to a wireless access point, effectively improving the user's networking experience effect. In addition, in the entire process, a data short message, which is more suitable for encrypted transmission, is adopted instead of a traditional text short message, information transmitted between the terminal device and the network device is encrypted, and thus security of information during transmission is guaranteed.

The process of encoding, by the terminal device, the identification information of the wireless access points to generate a data short message is described in detail below.

Given that in practical application scenarios, a receiving/sending mode of the short message may be implemented in a Protocol Data Unit (PDU) mode. As mentioned above, in the PDU mode, a short message may adopt multiple kinds of encodings, such as 7-bit (mainly used to receive/send ASCII characters), 8-bit (mainly used to receive/send data messages), UCS2 (mainly used to receive/send Unicode characters), and so on. In order to make a short message contains as many contents as possible and to facilitate encryption and compression, 8-bit encoding (i.e., an encoding format of a data short message) may be adopted in the embodiments of the specification.

In an embodiment of the specification, the identification information may comprise names and/or MAC addresses of wireless access points. Then, the process of encoding the identification information of the one or more wireless access points according to the preset data short message encoding format may comprise: for identification information of any of the wireless access points, determining name and/or MAC address of the wireless access point carried therein; encoding the name and/or the MAC address of the wireless access point to obtain an encoded character string in form of a data short message.

In this embodiment, a possible encoding structure may be: MAC address plus wireless access point name. Because byte length of the MAC address is fixed, the corresponding wireless access point name may be obtained after identifying the MAC address.

It can be understood that it is also possible that identification information merely contains either MAC addresses of wireless access points or names of the wireless access points. That is, only the MAC address or the name can represent a corresponding wireless access point.

In practical applications, identification information of multiple wireless access points is usually obtained. In this situation, if the identification information of the multiple wireless access points contains only multiple MAC addresses, the multiple MAC addresses may be encoded directly, for example, MAC addresses MAC1, MAC2, and MAC3 of three wireless access points may be encoded.

If the identification information contains names of the wireless access points, in order to identify names of different wireless access points accurately during the phase of decoding, length information of the names will be set during the phase of encoding, since the names are usually customized and do not have a unified standard. For example, encoding may be performed based on: byte length of name 1 plus name 1, byte length of name 2 plus name 2, byte length of name 3 plus name 3, and thus the names of different wireless access points may be determined.

Of course, the identification information may further comprise: byte lengths of the names of wireless access points and/or type information of wireless access points. Then encoding the identification information of the one or more wireless access points according to the preset data short message encoding format comprises: for the identification information of the one or more wireless access points, determining names and/or MAC addresses, byte lengths of the names and/or type information of the wireless access points carried therein; encoding the names and/or the MAC addresses, the byte lengths of the names and/or the type information of the wireless access points to obtain an encoded character string in form of a data short message.

Figure 3A:
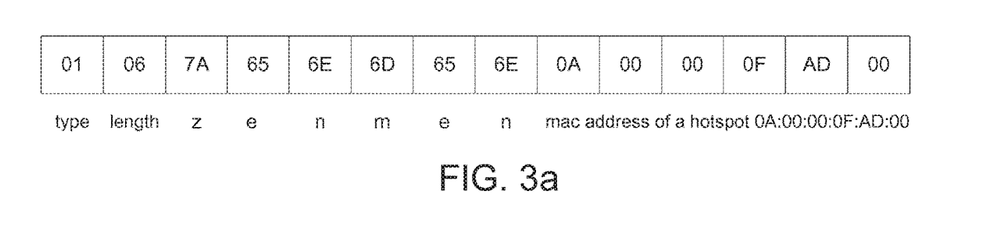
FIGS. 3a and 3b are schematic diagrams of encoding identification information of wireless access points provided by an embodiment of the specification.

As a possible specific implementation, the following encoding structure may be adopted in the process of encoding:

Type-Length-Name-Address(Mac)

A character string is usually obtained after encoding. As shown in FIG. 3a, in a character string obtained after encoding, each block represents a byte (there is no such block as shown in the figure in a practical encoding result, and the block is merely provided to highlight each byte, and it should not be interpreted as limitation on the present application). Each byte is composed of 8 bits.

The first byte is used to reflect type information, and the first 4 bits in this byte represent encoding type of name of a wireless access point (0 representing ASCII encoding, 1 representing UCS2 encoding), and the last 4 bits represent type of the wireless access point (0 representing open wireless access point, 1 representing WEP-encrypted wireless access point, 2 representing WPA-encrypted wireless access point, 3 representing EAP-authenticated wireless access point). It can be seen that in the embodiments of the specification, the type may not only characterize encoding type of the wireless access point, but also characterize encryption type of the wireless access point. Of course, this is merely an example, and specific encoding content can be adjusted and set according to the needs of practical applications, and should not be interpreted as limitation on the present application.

The second byte is used to reflect name length of the wireless access point.

The third to the eighth bytes represent encoding of names of the wireless access point.

The ninth to the fourteenth bytes are MAC address of the wireless access point.

As can be seen from the above, the encoding in FIG. 3a represents an open wireless access point with a name of zenmen and a MAC address of 0A:00:00:0F:AD:00.

Figure 3B:
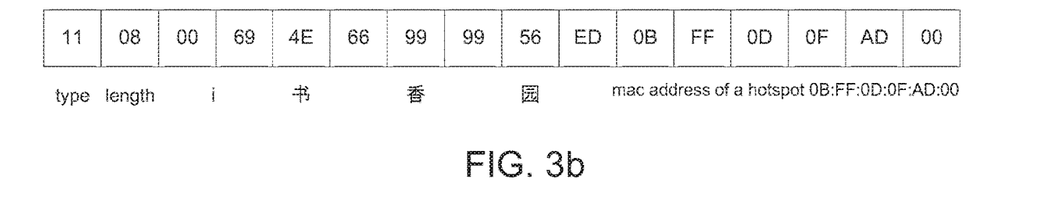

Similarly, identification information of a wireless access point whose name contains Chinese may also be encoded, as shown in FIG. 3b, and details are not described herein again.

In the above two examples, identification information of a wireless access point is taken as an example for illustration. If identification information of multiple wireless access points needs to be encoded in practical applications, then identification of each wireless access point is encoded in sequence according to the above encoding format, and the encoding results are arranged in sequence.

As an embodiment of the specification, in order to improve security of information during transmission, the character string obtained by encoding may be encrypted after encoding. Encryption may be implemented in the following ways, such as equal-byte encryption (length of ciphertext after encryption is the same as length of plaintext), MD5 encryption, symmetric encryption, etc., which can be selected according to the needs of practical applications.

Further, a GZIP compression algorithm can also be applied to the encrypting result, to increase amount of identification information of access points carried by each data short message. After such processing, identification information of 10 wireless access points may be transferred in a 140-byte short message in average.

Through the above process of encoding and encryption, a corresponding query request data short message may be generated and sent to a designated network device (i.e., a short message gateway of a service provider). In an embodiment of the specification, a mobile phone used by a user is installed with software for sharing wireless access points. The software can automatically generate and send data short messages according to information in the query request. In specific, the software extracts information of searched wireless access point, generates a data short message through the above process of encoding and encryption, and then may send a query request data short message to a short message gateway according to a communication number of the short message gateway which is pre-stored in the software. Of course, the user also may edit receiving information of a corresponding network device (e.g., recipient number or address), and then the query request data short message is sent to a designated network device.

Figure 4:
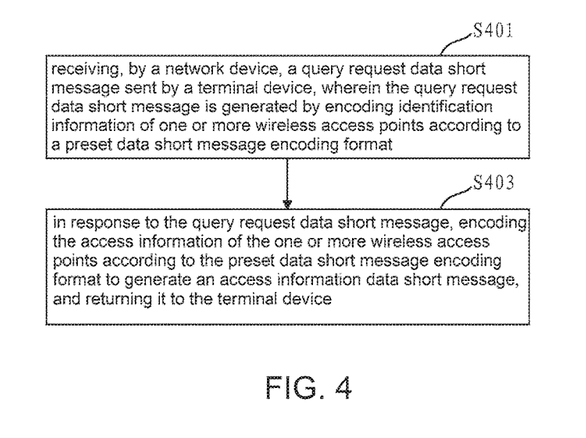
FIG. 4 is a schematic flowchart of a method for providing access information of wireless access points provided by an embodiment of the specification.

Accordingly, at a network device, a method for providing access information of wireless access points is also provided by an embodiment of the specification. A schematic flowchart of the method is illustrated in FIG. 4, and the method may comprise the following steps.

Step S401, a network device receives a query request data short message sent by a terminal device, and the query request data short message is generated by encoding identification information of one or more wireless access points according to a preset data short message encoding format.

The process of sending, by the terminal device, the query request data short message in the form of a short message can be described with reference to the foregoing content, which will not be repeated here.

Step S403, in response to the query request data short message, the access information of the one or more wireless access points is encoded according to the preset data short message encoding format to generate an access information data short message and the access information data short message is returned to the terminal device. The data short message encoding format is different from a text short message encoding format.

Based on the architecture shown in FIG. 1, in the embodiments of the specification, the network device may comprise a short message gateway and an access information storage server of a service provider. In specific, the short message gateway is responsible for receiving the query request data short message sent by the terminal device and decrypting the encoded and encrypted content therein. After decryption, the short message gateway will derive the identification information of the one or more wireless access points and send it to the access information storage server. In this way, the access information storage server may perform a query according to the identification information of the one or more wireless access points, and then feed the retrieved access information and identification information, etc. back to the short message gateway.

Further, the short message gateway may encode the access information and identification information, etc. fed back by the access information storage server.

During actual implementation, the process of in response to the query request data short message, generating an access information data short message by encoding the access information of the one or more wireless access points according to the preset data short message encoding format and returning it to the terminal device may comprise: performing a query, by the access information storage server, according to the identification information of the one or more wireless access points; sending, to the short message gateway, the retrieved identification information and access information of the one or more wireless access points; encoding, by the short message gateway, the identification information and the access information of the one or more wireless access points according to the preset data short message encoding format to generate the access information data short message; sending the access information data short message to the terminal device.

Here, it should be noted that the process of encoding and encrypting and then generating an access information data short message by the short message gateway is similar to the process of generating a query request data short message by the terminal device as above mentioned.

In specific, in case of identification information of a wireless access point, only name (and/or MAC address) and access information of the wireless access point usually needs to be encoded.

For example, if the MAC address of the wireless access point is encoded in the query request data short message, then MAC address plus password may be encoded at the phase of providing access information.

Alternatively, if the name of the wireless access point and byte length of the name are encoded in the query request data short message, then name length plus name plus password may be encoded at the phase of providing access information.

In case of multiple wireless access points, if MAC addresses are used, then multiple MAC addresses and corresponding passwords (and their password lengths, because the password length is not fixed) may be encoded, for example, MAC1 plus length of Password 1 plus password 1, MAC2 plus length of password 2 plus password 2, MAC3 plus length of password 3 plus password 3.

Alternatively, if names of the wireless access points are used, then name lengths, names, password lengths, and passwords of multiple wireless access points need to be encoded. For example: length of name 1 plus name 1 plus length of password 1 plus password 1, length of name 2 plus name 2 plus length of password 2 plus password 2, length of name 3 plus name 3 plus length of password 3 plus password 3 are encoded.

In connection with the above FIG. 3a and FIG. 3b, in practical applications, the following encoding structure may also be adopted:

type-length-name-length-password

Figure 5A:
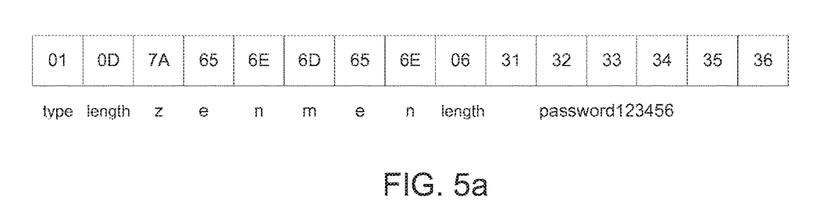
FIGS. 5a and 5b are schematic diagrams of encoding access information of wireless access points provided by an embodiment of the specification.

That is, the result of encoding, by the short message gateway, identification information and access information (a login password) of a wireless access point can be shown in FIG. 5a, i.e., replacing the original MAC address of a wireless access point with the login password and its length based on the information of the wireless access point as shown in FIG. 3a.

Figure 5B:
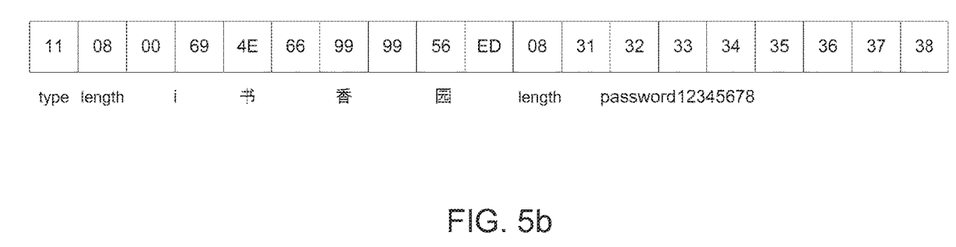

Similarly, as shown in FIG. 5b, the original MAC address is also replaced with the login password and its length based on the information of the wireless access point as shown in FIG. 3b.

After the above encoding, the encoding result may also be encrypted. The process of encryption is similar to that described above, and details will not be repeated herein again.

It can be seen that the process of encoding, by the short message gateway, the identification information and the access information of the one or more wireless access points according to the preset data short message encoding format may comprise: according to the identification information and the access information of any of the wireless access points, encoding, by the short message gateway, name, type information and access information of the wireless access point with the preset 8-bit encoding format to obtain an encoding result in form of the data short message. In this example, the short message gateway may also encrypt the encoding result with the aforementioned equal-byte encryption algorithm, which is not used as a limitation to the present application here.

Here, it should be noted that in the process of decryption and/or encryption, the short message gateway may adopt a key which has been agreed upon with the terminal device in advance, and adopt the same encryption algorithm and/or decryption algorithm.

Similarly, in order to make full use of the limited number of bytes of a short message, the short message gateway may also perform byte compression (e.g., GZIP compression) after encryption to generate an access information data short message, which is sent to the terminal device finally.

A device for obtaining access information of wireless access points is also provided by an embodiment of the specification based on a similar principle. The device includes a memory for storing computer program instructions and a processor for executing program instructions, and the computer program instructions, when executed by the processor, trigger the device to perform the above-mentioned methods.

A device for providing access information of wireless access points is also provided by an embodiment of the specification based on a similar principle. The device includes a memory for storing computer program instructions and a processor for executing program instructions, and the computer program instructions, when executed by the processor, trigger the device to perform the above-mentioned methods.

A computer readable medium storing computer readable instructions is also provided by an embodiment of the specification based on a similar principle, and the computer readable instructions executable by a processor to implement the above-mentioned methods.

Corresponding apparatuses for obtaining and for providing access information of wireless access points is also provided by an embodiment of the specification based on a similar principle.

Figure 6:
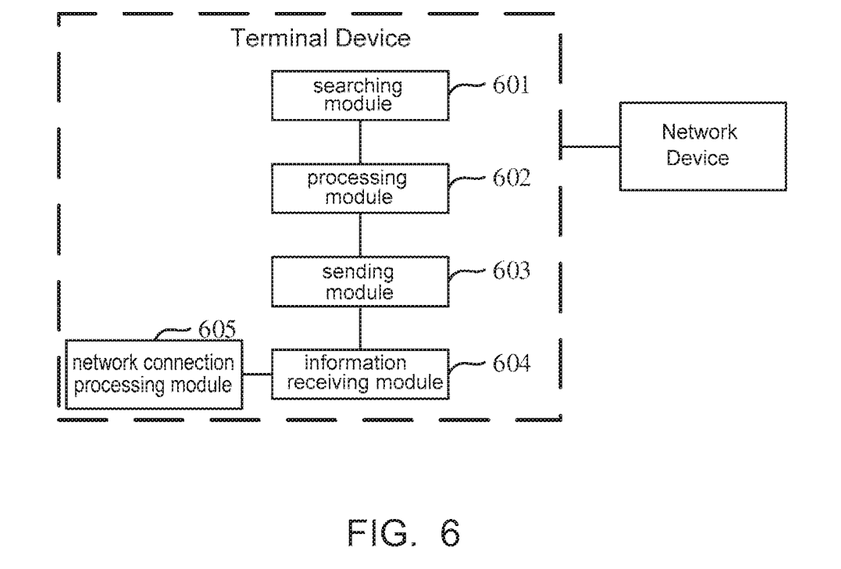
FIG. 6 is a schematic structural diagram of an apparatus for obtaining access information of wireless access points provided by an embodiment of the specification.

As shown in FIG. 6, at a terminal device, an apparatus for obtaining access information of wireless access points is provided by an embodiment of the specification. The apparatus comprises:

a searching module 601 configured to search for wireless access points to obtain identification information of one or more wireless access points;

a processing module 602 configured to encode and encrypt the identification information of the one or more wireless access points according to a preset data short message encoding format to generate an encrypted query request data short message;

a sending module 603 configured to send the query request data short message to a designated network device; and an information receiving module 604 configured to receive an access information data short message which is returned by the designated network device in response to the query request data short message and is encoded and generated according to the preset data short message encoding format.

Further, the identification information comprises at least names and MAC addresses of the wireless access points.

The processing module 602 is configured to determine name and/or MAC address of the wireless access point carried in identification information of any of the wireless access points for identification information of any of the wireless access points; and encode the name and/or the MAC address of the wireless access point to obtain an encoded character string in form of a data short message.

Further, the identification information further comprises byte lengths of names of the wireless access points and/or type information of the wireless access points. The processing module 602 is configured to determine the names and/or the MAC addresses, the byte lengths of the names and/or the type information of the wireless access points carried in any of multiple pieces of identification information for any of multiple pieces of identification information; and encode the names and/or the MAC addresses, the byte lengths of the names and/or the type information of the wireless access points to obtain an encoded character string in form of a data short message.

Further, the processing module 602 is configured to encode the identification information of the one or more wireless access points with a preset 8-bit encoding format to obtain an encoded character string in form of a data short message.

Further, the processing module 602 is configured to encrypt an encoding result.

Further, the processing module 602 is configured to encrypt the encoding result with an equal-byte encryption algorithm; and byte length of the encoding result after encryption is the same as byte length of that before encryption.

Further, the processing module 602 is also configured to perform character compression on the encrypting result with a compression algorithm.

Further, the sending module 603 is configured to send the query request data short message to a preset communication port of a designated short message gateway.

The apparatus further comprises: a network connection processing module 605 configured to extract the identification information and access information of the one or more wireless access points from the received access information data short message; and connect to one of the one or more wireless access points with the identification information and the access information.

Figure 7:
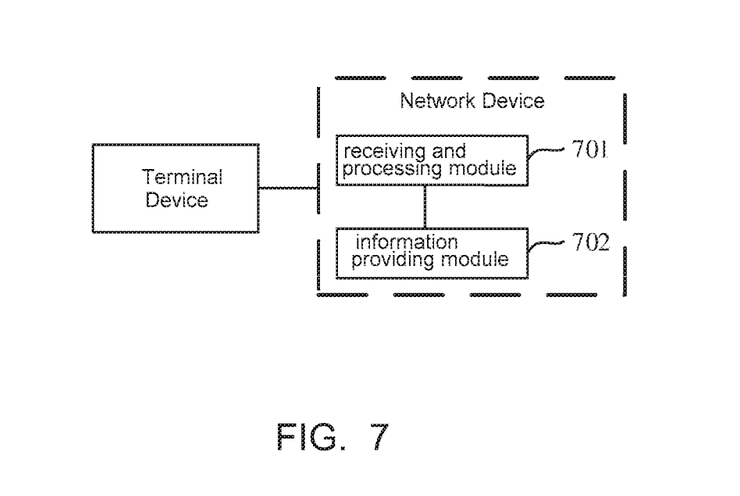
FIG. 7 is a schematic structural diagram of an apparatus for providing access information of wireless access points provided by an embodiment of the specification.

Accordingly, as shown in FIG. 7, at a network device, an apparatus for providing access information of wireless access points is provided by an embodiment of the specification. The apparatus comprises:

a receiving and processing module 701 configured to receive a query request data short message sent by a terminal device, and the query request data short message is generated by encoding identification information of one or more wireless access points according to a preset data short message encoding format; and an information providing module 702 configured to encode, in response to the query request data short message, the access information of the one or more wireless access points according to a preset data short message encoding format to generate an access information data short message and return it to the terminal device.

Further, the network device comprises: a short message gateway and an access information storage server.

Further, the receiving and processing module 701 in the short message gateway is configured to receive the query request data short message sent by the terminal device; extract the identification information of the one or more wireless access points from the query request data short message; and send it to the access information storage server.

The identification information comprises: at least one type of names and MAC addresses of the wireless access points.

Further, the information providing module 702 is configured to perform a query according to the identification information of the one or more wireless access points; encode the retrieved identification information and the access information of the one or more wireless access points according to the preset data short message encoding format to generate the access information data short message; and send the access information data short message to the terminal device.

Further, the information providing module 702 is configured to encode, by the short message gateway, name and access information of the wireless access point with the preset data short message encoding format, for the identification information and the access information of any of the wireless access points.

Further, when the short message gateway receives identification information and access information of multiple wireless access points, the information providing module 702 is configured to encode, by the short message gateway, name, access information length, type information and access information of the wireless access point with the preset data short message encoding format, for any of multiple wireless access points.

Further, the information providing module 702 is configured to encode the identification information and the access information of the one or more wireless access points with a preset 8-bit encoding format.

Further, the information providing module 702 is also configured to encrypt an encoding result.

Further, the information providing module 702 is configured to encrypt the encoding result with an equal-byte encryption algorithm, and byte length of the encoding result after encryption is the same as byte length of that before encryption.

Further, the information providing module 702 is configured to perform byte compression on an encoding and encrypting result with a compression algorithm to generate the access information data short message.

The embodiments in the specification are described in a progressive manner. The identical or similar parts among the embodiments can be referred to each other, and an aspect detailed and emphasized by each embodiment is the part which is different from that in other embodiments. In particular, for the device and media embodiments, since they are basically similar to the method embodiments, the description is relatively simple, and the relevant parts can be referred to a part of the description of the method embodiments.

The devices and the media provided in the embodiments of the present application correspond to the method in a one-to-one manner. Therefore, the devices and the media also have beneficial effects similar to their corresponding methods.

Embodiments of the present disclosure may be provided as methods, systems, or computer program products. Therefore, the present disclosure may take the form of an embodiment entirely implemented in hardware, an embodiment entirely implemented in software, or an embodiment implemented by combining software and hardware. Moreover, the present disclosure may take the form of a computer program product implemented on one or more computer usable storage media (including but not limited to disk storage, CD-ROM, optical storage, etc.) containing computer usable program code.

The present disclosure is described with reference to flowcharts and/or block diagrams of methods, devices (systems), and computer program products according to the embodiments of the present disclosure. It should be understood that each flow and/or block in the flowchart and/or block diagram and a combination of the flow and/or block in the flowchart and/or block diagram may be implemented by computer program instructions. These computer program instructions can be provided to a processor of a general-purpose computer, a special-purpose computer, an embedded processing machine, or other programmable data processing devices to produce a machine that enables the instructions executed by the processor of the computer or other programmable data processing devices to produce an apparatus for implementing the functions specified in one flow or multiple flows of a flowchart and/or one block or multiple blocks of a block diagram.

These computer program instructions may also be stored in a computer readable memory that can direct a computer or other programmable data processing devices to work in a specific manner, so that the instructions stored in the computer readable memory produce an article of manufacture including an instruction device, and the instruction device implements the functions specified in one block or multiple blocks of a flowchart and/or one block or multiple blocks of a block diagram.

These computer program instructions can also be loaded onto a computer or other programmable data processing devices, so that a series of operating steps are performed on the computer or other programmable devices to produce computer-implemented processing, so that the instructions executed on the computer or other programmable devices provide steps for implementing the functions specified in one flow or multiple flows of a flowchart and/or one block or multiple blocks in a block diagram.

In a typical configuration, a computing device includes one or more processors (CPUs), input/output interfaces, network interfaces, and memories.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium comprises permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and a carrier.

It should also be noted that the terms "comprise", "include", "contain" or any other variant thereof are intended to cover non-exclusive inclusion, so that a process, method, goods or device that includes a series of elements not only includes those elements, but also includes other elements not explicitly listed, or include elements inherent to such process, method, goods, or device. With no further restrictions, the element defined by the sentence "include a/an . . . " does not exclude that there are other identical elements in the process, method, goods, or device that includes the element.

What is claimed is:

1. A method for obtaining access information of wireless access points by a terminal device when mobile data of the terminal device is not available, comprising:
    searching for wireless access points to obtain identification information of one or more wireless access points;
    encoding the identification information of the one or more wireless access points according to a preset data short message encoding format to generate a query request data short message;
    sending the query request data short message to a communication port of a short message gateway of a designated network device, wherein the communication port is designated by a data short message application running on the terminal device; and
    receiving an access information data short message which is returned by the designated network device in response to the query request data short message and is encoded and generated according to the preset data short message encoding format.

2. The method as recited in claim 1, wherein the identification information comprises: either or both of names of the wireless access points and MAC addresses of the wireless access points;
    wherein the step of encoding the identification information of the one or more wireless access points according to the preset data short message encoding format, comprising:
        for identification information of any wireless access point of the wireless access points, determining either or both of name of the wireless access point and MAC address of the wireless access point carried therein; and
        encoding the either or both of name of the wireless access point and the MAC address of the wireless access point to obtain an encoded character string in form of a data short message.

3. The method as recited in claim 2, wherein the identification information further comprises: either or both of byte lengths of the names of the wireless access points and type information of the wireless access points;
    wherein the step of encoding the identification information of the one or more wireless access points according to the preset data short message encoding format, comprising:
        for the identification information of the one or more wireless access points, determining either or both of the names of the wireless access points and the MAC addresses of the wireless access points, either or both of the byte lengths of the names of the wireless access points and the type information of the wireless access points carried therein; and
        encoding either or both of the names of the wireless access points and the MAC addresses of the wireless access points, either or both of the byte lengths of the names of the wireless access points and the type information of the wireless access points to obtain an encoded character string in form of a data short message.

4. The method as recited in claim 1, wherein the step of encoding the identification information of the one or more wireless access points according to the preset data short message encoding format, comprising:
encoding the identification information of the one or more wireless access points with a preset 8-bit encoding format to obtain an encoded character string in form of a data short message.

5. The method as recited in claim 1, wherein before the step of generating the query request data short message, the method further comprising:
encrypting an encoding result.

6. The method as recited in claim 5, wherein encrypting the encoding result, comprising:
encrypting the encoding result with an equal-byte encryption algorithm;
wherein byte length of the encoding result after encryption is the same as byte length of the encoding result before encryption.

7. The method as recited in claim 5, wherein the method further comprising:
compressing byte length of an encrypting result with a compression algorithm.

8. The method as recited in claim 1, wherein the method further comprising:
extracting identification information and access information of the one or more wireless access points from the received access information data short message; and
connecting to one of the one or more wireless access points with the identification information and the access information.

9. A method for providing access information of wireless access points, comprising:
receiving, by a network device at a communication port of a short message gateway of the network device, a query request data short message sent by a terminal device when mobile data of the terminal device is not available, wherein the query request data short message is generated by encoding identification information of one or more wireless access points according to a preset data short message encoding format, and wherein the communication port is designated by a data short message application running on the terminal device; and
in response to the query request data short message, encoding the access information of the one or more wireless access points according to the preset data short message encoding format to generate an access information data short message and returning the access information data short message to the terminal device.

10. The method as recited in claim 9, wherein the network device comprises a short message gateway and an access information storage server.

11. The method as recited in claim 10, wherein the step of receiving, by the network device, the query request data short message sent by the terminal device, comprising:
receiving, by the short message gateway, the query request data short message sent by the terminal device; and
extracting identification information of the one or more wireless access points from the query request data short message, and sending the identification information of the one or more wireless access points to the access information storage server;
wherein the identification information comprises either or both of names of the wireless access points and MAC addresses of the wireless access points.

12. The method as recited in claim 10, wherein the step of in response to the query request data short message, encoding the access information of the one or more wireless access points according to the preset data short message encoding format to generate the access information data short message and returning the access information data short message to the terminal device, comprising:
performing a query, by the access information storage server, according to the identification information of the one or more wireless access points;
sending, to the short message gateway, the retrieved identification information and access information of the one or more wireless access points;
encoding, by the short message gateway, the identification information and the access information of the one or more wireless access points according to the preset data short message encoding format to generate the access information data short message; and
sending, by the short message gateway, the access information data short message to the terminal device.

13. The method as recited in claim 12, wherein the step of encoding, by the short message gateway, the identification information and the access information of the one or more wireless access points according to the preset data short message encoding format, comprising:
for the identification information and the access information of any wireless access point of the wireless access points, encoding, by the short message gateway, name and access information of the wireless access point with the preset data short message encoding format.

14. The method as recited in claim 12, wherein the step of encoding, by the short message gateway, the identification information and the access information of the one or more wireless access points according to the preset data short message encoding format when the short message gateway receives identification information and access information of multiple wireless access points, comprising:
for any wireless access point of multiple wireless access points, encoding, by the short message gateway, name, access information length and access information of the wireless access point with the preset data short message encoding format.

15. The method as recited in claim 12, wherein the step of encoding, by the short message gateway, the identification information and the access information of the one or more wireless access points according to the preset data short message encoding format, comprising:
encoding, by the short message gateway, the identification information and the access information of the one or more wireless access points with a preset 8-bit encoding format.

16. The method as recited in claim 12, wherein before the step of generating the access information data short message, the method further comprising:
encrypting an encoding result.

17. The method as recited in claim 16, wherein the step of encrypting the encoding result, comprising:
encrypting the encoding result with an equal-byte encryption algorithm;
wherein byte length of the encoding result after encryption is the same as byte length of the encoding result before encryption.

18. The method as recited in claim 12, wherein the step of generating the access information data short message, comprising:
performing byte compression on an encoding and encrypting result with a compression algorithm to generate the access information data short message.

19. A device for providing access information of wireless access points, the device including a memory for storing computer program instructions and a processor for executing program instructions, wherein the computer program instructions, when executed by the processor, trigger the device to perform the following:

receiving, by a network device at a communication port of a short message gateway of the network device, a query request data short message sent by a terminal device when mobile data of the terminal device is not available, wherein the query request data short message is generated by encoding identification information of one or more wireless access points according to a preset data short message encoding format, and wherein the communication port is designated by a data short message application running on the terminal device; and in response to the query request data short message, encoding the access information of the one or more wireless access points according to the preset data short message encoding format to generate an access information data short message and returning the access information data short message to the terminal device.

* * * * *